(12) United States Patent
Zhong et al.

(10) Patent No.: US 12,179,093 B2
(45) Date of Patent: Dec. 31, 2024

(54) ARCADE MACHINE

(71) Applicant: QANBA USA, LLC, Daly City, CA (US)

(72) Inventors: Xianglong Zhong, Shenzhen (CN); Guanghua Tan, Shenzhen (CN)

(73) Assignee: QANBA USA, LLC, Daly City, CA (US)

( * ) Notice: Subject to any disclaimer, the term of this patent is extended or adjusted under 35 U.S.C. 154(b) by 253 days.

(21) Appl. No.: 17/864,177

(22) Filed: Jul. 13, 2022

(65) Prior Publication Data

US 2023/0330520 A1    Oct. 19, 2023

(30) Foreign Application Priority Data

Apr. 18, 2022   (CN) ......................... 202220920597.1

(51) Int. Cl.
*A63F 13/90* (2014.01)
*A63F 13/24* (2014.01)

(52) U.S. Cl.
CPC .................................. *A63F 13/24* (2014.09)

(58) Field of Classification Search
CPC .. A63F 7/36; A63F 13/24; A63F 13/25; A63F 13/90; G07F 17/3216
See application file for complete search history.

(56) References Cited

U.S. PATENT DOCUMENTS

| 4,440,457 A | 4/1984 | Fogelman et al. |
| 2002/0006828 A1* | 1/2002 | Gerding ................ A63F 13/235 463/46 |

(Continued)

FOREIGN PATENT DOCUMENTS

| GB | 2393133 A | * | 3/2004 | ............. A63F 13/08 |
| JP | S54-040022 U | | 3/1979 | |

(Continued)

OTHER PUBLICATIONS

Hameko, "Arcade cabinet style" game desk that turns your home into a game center; Jul. 3, 2013; Internet: URL: https://www.4gamer.net/games/999/G999902/20130624050/; (see provided machine translation (Year: 2013) (Year: 2013).*

(Continued)

*Primary Examiner* — Jasson H Yoo
(74) *Attorney, Agent, or Firm* — Lewis Roca Rothgerber Christie LLP

(57) ABSTRACT

An arcade machine includes a support bracket; a gaming table detachably connected to the support bracket; and a control unit coupled to the gaming table. The control unit includes a control circuit board, a joystick, control buttons and a connection interface electrically connected to the control circuit board. The control circuit board, the joystick, and the control buttons are arranged on the gaming table, and the connection interface includes a video interface configured for connecting a display screen and an interactive interface configured for connecting to a computer or a game machine. The arcade machine can be connected to and is applicable to a computer and a variety of game machines, thereby obtaining more choices and experiences of game modes and improving the applicability of the arcade machine. The detachable design of the gaming table can effectively reduce the difficulty of handling and reduce transportation costs.

9 Claims, 5 Drawing Sheets

(56) References Cited

U.S. PATENT DOCUMENTS

2004/0004112 A1  1/2004  Petruccelli
2010/0255915 A1  10/2010  Spradley
2020/0222816 A1  7/2020  Mercier et al.

FOREIGN PATENT DOCUMENTS

| JP | S01-077794 U | 5/1989 |
|----|---|---|
| JP | H06-269565 A | 9/1994 |
| JP | H06-296756 A | 10/1994 |
| JP | H06-083093 U | 11/1994 |
| JP | 2004-105468 A | 4/2004 |
| JP | 3157351 U | 2/2010 |
| WO | WO 2016/164972 A1 | 10/2016 |

OTHER PUBLICATIONS

Extended European Search Report for Application No. 22204165.9, mailed Aug. 14, 2023, 9 pages.

Hameko, "Arcade housing style" game desk, making home a game center, XAC 14Gamer.net [online] online], Jul. 3, 2013 [searched Aug. 15, 2023] 2023], Internet (URL: https://www.4gamer.net/games/999/G999902/20130624050/), 12 pages.

A. Sun Channel, 2000 in 1 Heroes Box 5, making home a game center, YouTube [online][video] video], Feb. 24, 2019 [searched Aug. 15, 2023] 2023], Internet (URL:https://www.youtube.com/watch?v=Q5HxVqILQKA), 4 pages.

Japanese Office action for Application No. 2022-130886, mailed Aug. 22, 2023, 7 pages.

\* cited by examiner

ARCADE MACHINE

CROSS-REFERENCE TO RELATED APPLICATION

The present application claims priority to Chinese Patent Application Number 202220920597.1, filed Apr. 18, 2022, the entire contents of which are hereby incorporated herein by reference.

TECHNICAL FIELD

The present disclosure relates to arcade machines.

BACKGROUND

Existing arcade machines may include a rack, a gaming table and a display screen mounted on the rack. Additionally, the rack, the gaming table and the display screen may be fixedly connected and sold as a complete machine. As such, the existing arcade machine designs can make handling the arcade machine difficult and expensive to transport.

SUMMARY

The present disclosure relates to various embodiments of an arcade cabinet including a detachable gaming table that can effectively reduce the difficulty of handling the arcade machine and can reduce the costs associated with transporting the arcade machine. The arcade cabinet according to various embodiments of the present disclosure can be connected to and compatible with a computer and a variety of game machines, and this broad compatibility can provide additional choices and experiences of game modes, thereby improving the applicability of the arcade machine.

In one embodiment, the arcade machine includes a support bracket; a gaming table detachably connected to the support bracket; and a control unit coupled to the gaming table. The control unit includes a control circuit board, a joystick, control buttons, and a connection interface that are electrically connected to the control circuit board. The control circuit board, the joystick, and the control buttons are arranged on the gaming table, and the connection interface includes a video interface configured for connecting a display screen and an interactive interface configured for connecting to a computer or a game machine.

In some embodiments, the support bracket may include a main bracket and a connection bracket connected to the main bracket, and the gaming table is on the main bracket and engaged with the connection bracket. The connection bracket may include a support surface configured for supporting a display.

In some embodiments, the control circuit board may include a built-in video switching software to match working modes of different game machines or computers, and the control unit may further include a switching control corresponding to the video switching software.

In some embodiments, the switching control may be provided on the connection bracket.

In some embodiments, the connection bracket includes a carrier and support members connecting both ends of the carrier, and a side surface of the carrier facing away from the main bracket is the supporting surface, a side of each support member facing away from the carrier is connected to the main bracket, and a side of each support member is protruded with an engagement portion configured for engaging with the gaming table.

In some embodiments, the carrier includes a carrier plate and a surrounding edge connected to a periphery of the carrier plate. The carrier plate and the surrounding edge are enclosed to form an accommodating cavity. The accommodating cavity is provided with a filling plate, and a surface of the filling plate facing away from the carrier plate is flush with a side of the surrounding edge facing away from the carrier.

In some embodiments, the gaming table is provided with a placing area and a gaming area. The gaming area is located on a side of the placing area away from the connection bracket, and the placing area is configured for placing a keyboard. The joystick and the control buttons are arranged in or on the operation area.

In some embodiments, the main bracket includes a series of branch brackets that are detachably connected, and each of the branch brackets includes a series of hollow rods with rectangular cross-sections.

In some embodiments, the gaming table includes a box body and a control panel detachably connected. The control circuit board is arranged in the box body, and the joystick and the control buttons are arranged on the control panel.

In some embodiments, the control panel is detachably connected to the box body through a cover member, the control panel is fixedly connected to the cover member, and the cover member is provided with an engagement end and a screwing end opposite to the engagement end. The engagement end is engaged with the box body, and the screwing end is screwed to the box body.

BRIEF DESCRIPTION OF THE DRAWINGS

In order to explain the embodiments of the present disclosure more clearly, a brief introduction regarding the accompanying drawings that can be used for describing the embodiments of the present disclosure or the prior art is given below. The accompanying drawings described as follows are only some embodiments of the present disclosure. As will be appreciated by those skilled in the art, variations of the present drawings may be obtained to cover other embodiments.

DETAILED DESCRIPTION

Figure 1:
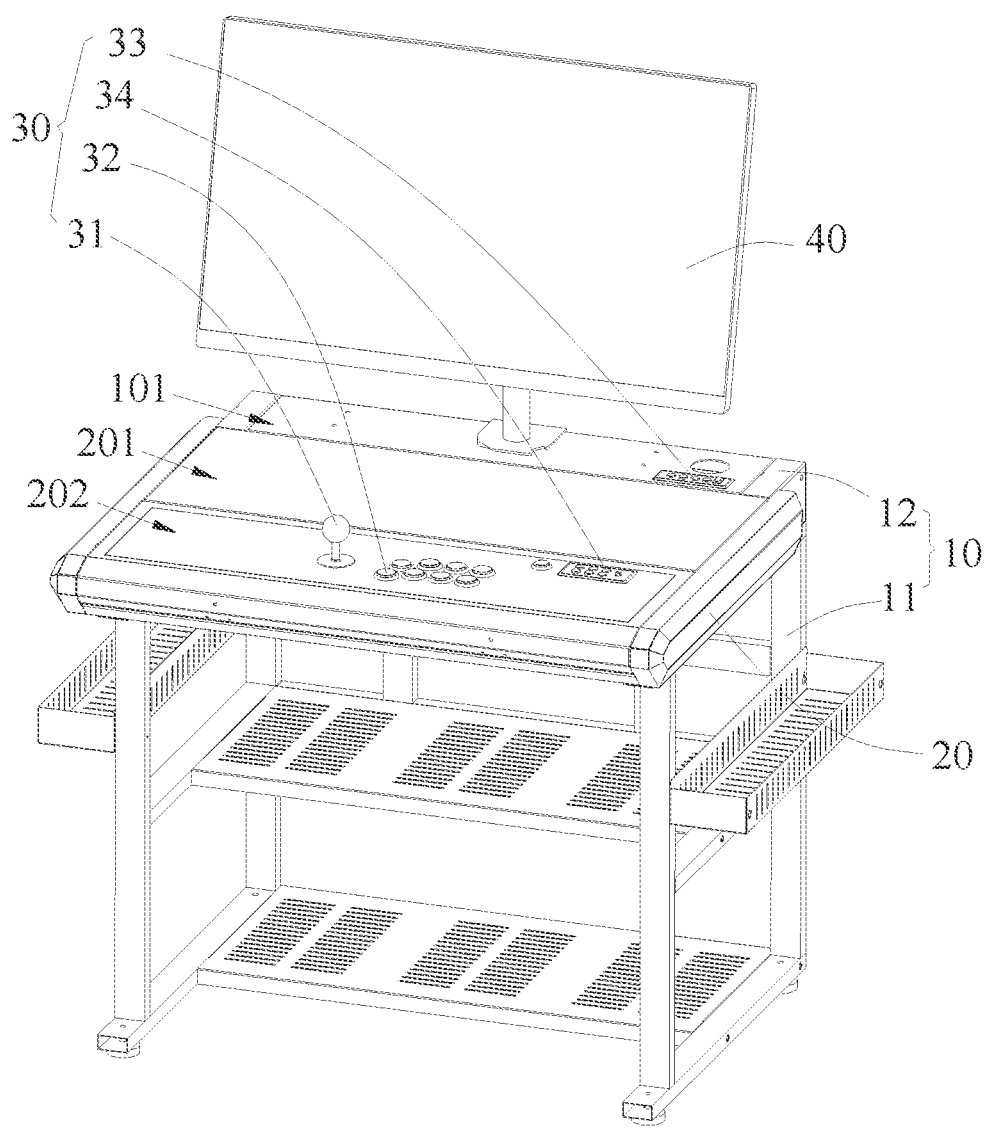
FIG. 1 is a first structural schematic view of an arcade machine according to an embodiment of the present disclosure.

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

It is noted that when a component is referred to as being "fixed to" or "disposed on" another component, it can be directly or indirectly on another component. When a component is referred to as being "connected to" another component, it can be directly or indirectly connected to another component.

In the description of the present disclosure, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present disclosure conveniently and simplify the description, but not to indicate or imply that an indicated device or component must have specific locations or be constructed and manipulated according to specific locations; therefore, these terms should not be considered as any limitation to the present disclosure.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly include one or more such technical feature(s). In the description of the present disclosure, "a plurality of" means two or more, unless there is additional explicit and specific limitation.

Referring to FIGS. 1 to 6, the arcade machine provided by the present disclosure will now be exemplarily described.

The arcade machine may include a support bracket 10, a gaming table 20 and a control unit 30. The gaming table 20 can be detachably connected to the support bracket 10.

The control unit 30 may include a control circuit board (not shown), a joystick 31, control buttons 32 and a connection interface (not shown) that are electrically connected to the control circuit board. The control circuit board, the joystick 31, and the control buttons 32 may be arranged in or on the gaming table 20. The connection interface may include a video interface for connecting to the display screen 40 and an interactive interface for connecting to a computer or a game machine. After the video interface is connected to the display screen 40 and the interactive interface is connected to the computer or the game machine, the operator can start the game program. Then, the content of the game may be displayed on the display screen 40, and the operator plays the game by manipulating the joystick 31 and/or the control buttons 32.

In some embodiments, the connection interface can be an interface such as VGA, DVI, HDMI, or DP, as long as it can realize the transmission of video signals.

In some embodiments, the video interface can be connected to the display screen 40. The display screen 40 can be a computer monitor, a TV screen, an LED display screen or an LCD display screen, etc., as long as it can receive image information and display the image information on the screen. The interactive interface is connected to the computer or the game machine, so that the control unit 30 can be connected to the computer or the game machine to perform game control operations. In other words, the arcade machine provided in the embodiment can be connected to and compatible with a computer and a variety of game machines, so as to provide more choices and experiences of game modes. In addition, in some embodiment, the arcade machine can be connected to an existing display screen and an existing game machine/computer through the setting of the connection interface (i.e., the video interface and the interactive interface, respectively). In other words, the arcade machine can be sold separately without the need to be equipped with the display screen 40 and the game machine/computer, thereby reducing the structure of the arcade machine, reducing the packaging size, and reducing the transportation cost.

In some embodiments, in each structure of the control unit 30, the control circuit board, the joystick 31 and the operation controls may all be provided on the gaming table 20, and the connection interface may be provided on the gaming table 20 or on the support bracket 10. When the video interface and/or the interactive interface are provided in the support bracket 10, the video interface and/or the interactive interface are electrically connected with the control circuit board through wires.

In some embodiments, the control unit 30 can be integrally fixed on the gaming table 20. Combined with the detachable connection design of the gaming table 20 and the support bracket 10, the arcade machine can be split into two separate packages for transportation and handling during transportation. Accordingly, the difficulty of handling and transportation costs can be effectively reduced compared to related art systems.

In some embodiments, the main structure (the control circuit board, the joystick 31 and the control buttons 32) of the control unit 30 can be arranged on the gaming table 20, and part of the structure (e.g., the connection interface) can be fixed on the support bracket 10, and this part of the structure (e.g., the connection interface) fixed on the support bracket 10 may be connected to the main structure by wires. In some embodiments, the connection can be a detachable connection. In the case of detachable connection of wires, combined with the detachable connection design of the gaming table 20 and support bracket 10, the arcade machine can be split into two separate packages for transportation and handling during transportation, thereby effectively reducing the difficulty of handling and reducing transportation costs. In the case where the wires are not detachable, the gaming table 20 and the support bracket 10 can be physically connected by wires. After the gaming table 20 is removed from the support bracket 10, the position of the gaming table 20 can be adjusted within the allowable range of the wire length. For example, the gaming table 20 can be placed in the storage space between the rods of the support bracket 10, thereby effectively reducing the packaging size of the arcade machine, and reducing the difficulty of handling and the transportation costs.

From the foregoing, the arcade machine provided by various embodiments can be connected to and compatible with the computer and various game machines, so as to provide more choices and experiences of game modes. This improves the compatibility of the arcade machine. The size of the arcade cabinet is also effectively reduced due to the detachable design of the gaming table 20 from the support bracket 10. The difficulty of handling is thereby reduced and the transportation costs are reduced.

In the structure shown in FIG. 1, the gaming table 20 may be suitable for single-person operation, and correspondingly, there may be one set of a joystick 31 and control buttons 32. In the structure shown in FIG. 6, the gaming table may be suitable for two-person operation, and correspondingly, there may be two sets of joysticks 31 and control buttons 32.

Figure 2:
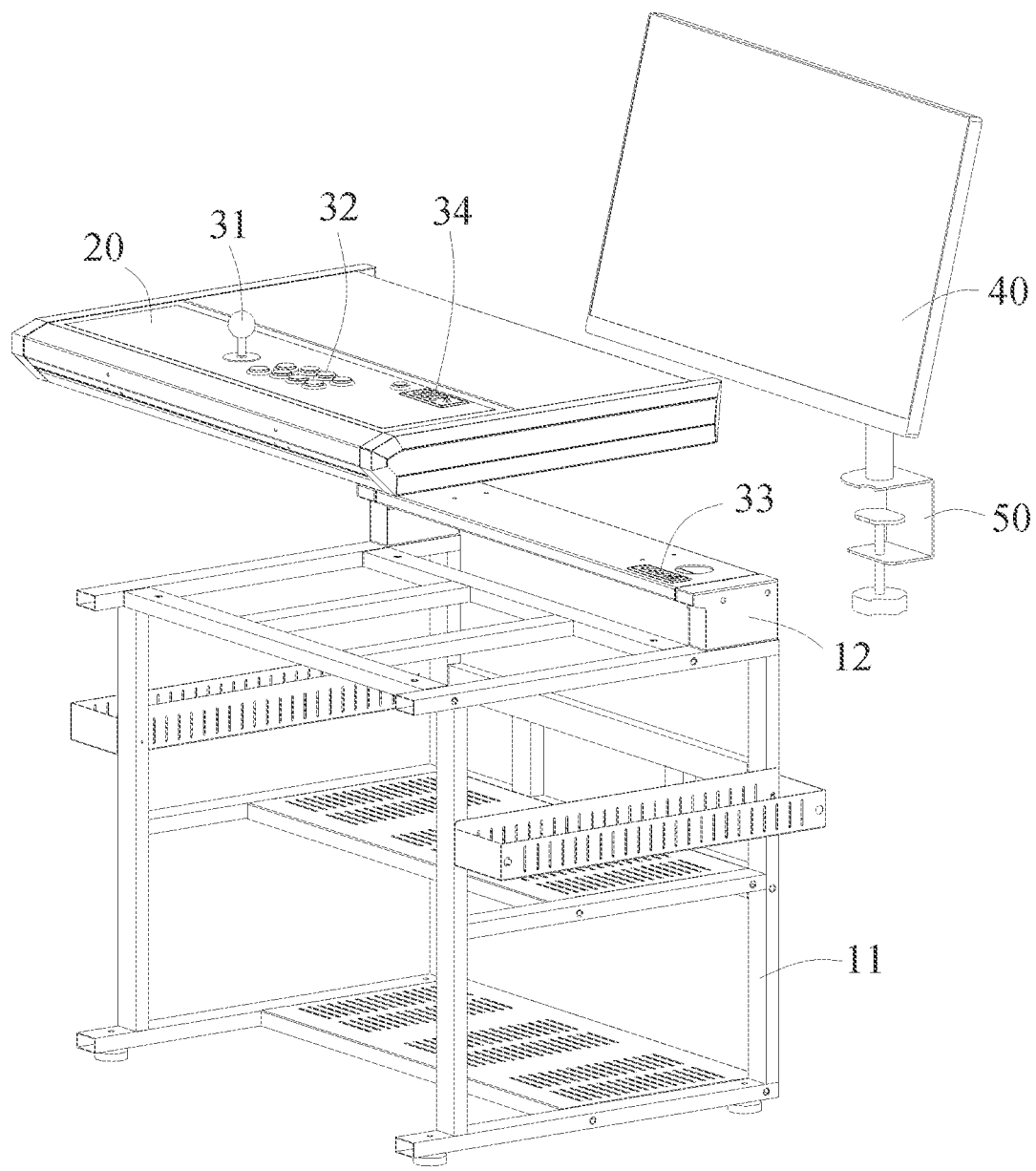
FIG. 2 is an exploded schematic view of the structure of the embodiment of the arcade machine illustrated in FIG. 1.

In another embodiment of the present disclosure, referring to FIGS. 1 and 2, the support bracket 10 may include a main bracket 11 and a connection bracket 12 connecting the main bracket 11. The gaming table 20 may be placed on the main bracket 11 and can be engaged with the connection bracket 12. The connection bracket 12 may be provided with a supporting surface 101 on which the display is placed.

Figure 5:
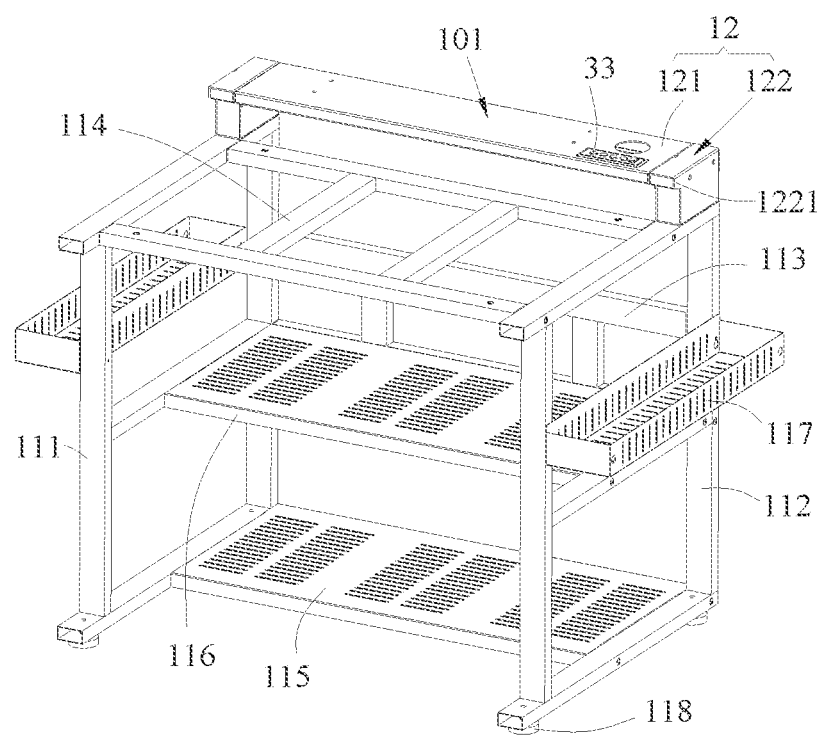
FIG. 5 is a structural schematic view of a support bracket according to an embodiment of the present disclosure.

Referring to FIG. 5, an engagement portion 1221 is protruding from the surface (e.g., a front surface) of the connection bracket 12 and is facing the gaming table 20. The gaming table 20 may be provided with a corresponding slot at the position of the engagement portion 1221. When the gaming table 20 is connected to the support bracket 10, the engagement portion 1221 can be inserted into the slot to limit the movement of the gaming table 20. In other embodiments, the engagement portion 1221 can also be provided on the gaming table 20 and the slot can be provided in connection bracket 12. In some embodiments, the engagement portion 1221 (or, alternatively, the slot) is located on an upper end of the connection bracket 12, and the slot (or, alternatively, the engagement portion 1221) is located on the upper end of the gaming table 20.

In some embodiments, the gaming table 20 may be supported by the main bracket 11. The connection bracket 12 can be fixed on the upper side of the main bracket 11 and can restrict the movement of the gaming table 20 by being engaged with the gaming table 20. In some embodiments, the connection bracket 12 and the gaming table 20 are located on the same horizontal plane (e.g., both are placed on the upper surface of the main bracket 11), and the slot is provided on the side of the gaming table 20. Using the gaming table 20 on the front side of the connection bracket 12 as a reference direction when assembling, the gaming table 20 may be placed on the main bracket 11 and then moved backwards so that the engagement portion 1221 is inserted into the slot to complete the engagement between the operation table 20 and the connection bracket 12. Compared with arranging the connection position of the slot and the engagement portion 1221 on the lower side of the gaming table 20, the alignment of the slot and the engagement portion 1221 is not obstructed by the gaming table 20 during the operation of the gaming table 20 and the connection bracket 12 being engaged together, which improves the convenience of assembly.

In some embodiments, the surface (upper surface) of the connection bracket 12 facing away from the main bracket 11 is the supporting surface 101 for supporting the display. It should be noted that the supporting surface 101 is used for supporting the display, and it is only required to have the ability to support the display, and it is not required that the display be placed on the connection bracket 12 in actual use. In some uses, the display can be fixed by other support structures, or fixed on the connection bracket 12 by the C-clamp 50. The connection bracket 12 can be used as the direct or indirect support structure of the display. When the control buttons 32 or other structures on the gaming table 20 are repaired or otherwise serviced, the gaming table 20 can be removed from the support bracket 10 without affecting the fixed support of the display. In addition, the connection bracket 12 can be fixedly connected to the main bracket 11 (e.g., a welding connection can be used), which can improve the stability of the display compared to placing the display on the gaming table 20.

In some embodiments, the gaming table 20 and the main bracket 11 can be detachably connected by fasteners. The main bracket 11 is provided with an assembly hole. After the gaming table 20 is placed on the main bracket 11 and engaged with the connection bracket 12, the fastener passes through the assembly hole and is screwed with the gaming table 20 to achieve the detachable connection between the gaming table 20 and the main bracket 11. In some embodiments, the fasteners can be screws.

In another embodiment of the present disclosure, referring to FIG. 5, the connection bracket 12 may include a carrier 121 and support members 122 connecting both ends of the carrier 121. A surface of the carrier 121 facing away from the main bracket 11 is the supporting surface 101 for support the display, a side of the support member 122 facing away from the carrier 121 is connected to the main bracket 11, and a side of the support member 122 facing the gaming table 20 is protruding with the engagement portion 1221 that is engaged with the gaming table 20.

In order to improve the aesthetic effect of the structure, the upper surface of the carrier 121 may be flush (or substantially flush) with the upper surface of the gaming table 20. Since the gaming table 20 has a certain thickness, the connection bracket 12 conforms to the shape of the support bracket 10 and the carrier 121, which can reduce the material consumption compared with a whole plate (e.g., a thick plate or block).

The engagement portion 1221 is provided on the support member 122 to ensure the structural integrity of the carrier 121, simplify the design, and improve the aesthetic effect. In some embodiments, the engagement portion 1221 is close to the upper end side of the support member 122. In other embodiments, the engagement portion 1221 can also be arranged in the middle of the support member 122, as long as the gaming table 20 is engaged.

In some embodiments, the support members 122 and the carrier 121 are sheet metal parts, which may be formed by stamping metal plates such as stainless steel and cold-rolled sheets. The support member 122 and the carrier 121 are designed as sheet metal parts, which can reduce the structural weight while ensuring the structural strength, so as to reduce the production costs and transportation costs.

Figure 4:
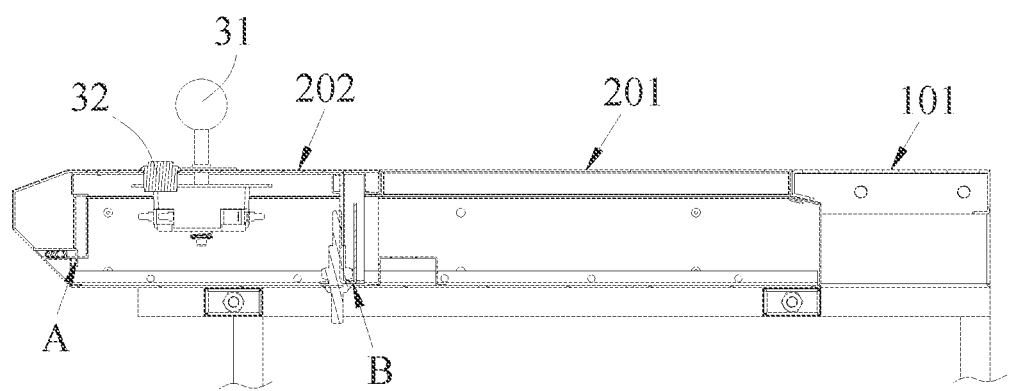
FIG. 4 is a cross-sectional view of a gaming table according to an embodiment of the present disclosure.

In some embodiments of the present disclosure, referring to FIG. 4, the carrier 121 includes a carrier plate and a surrounding edge connected to the periphery of the carrier plate. The carrier plate and the surrounding edge are enclosed to form an accommodating cavity, and the accommodating cavity is configured with a filling plate (not shown). The surface of the filling plate facing away from the carrier plate is flush (or substantially flush) with the side of the periphery facing away from the carrier 121.

In some embodiments, the carrier 121 is a sheet metal part, the periphery of the metal plate part is punched and bent to form a surrounding edge, and the inner side of the bending line is the carrier plate. The surrounding edge is enclosed to form the accommodating cavity. In the illustrated embodiment, the filling plate is arranged in the accommodating cavity, and the thickness of the filling plate is equal (or substantially equal) to the height of the accommodating cavity such that the lower surface of the filling plate is flush (or substantially flush) with the lower edge of the surrounding edge. Such arrangement enables the carrier 121 to serve as the clamping position of the C-clamp 50 at the position of the filling plate (e.g., the upper surface of the carrier and the lower surface of the filling plate are the clamping surfaces of the C-clamp 50). The display is fixed on the carrier 121 through the C-clamp 50.

In some embodiments, the filling plate is a PVC plate, and those skilled in the art can also select a wooden plate, a composite plate, etc. as the filling plate, which is not limited here.

In some embodiments of the present disclosure, referring to FIGS. 1 and 4, the gaming table 20 is provided with a placing area 201 and a gaming area 202. The gaming area 202 is located on the side of the placing area 201 away from the connection bracket 12 (e.g., the placing area 201 is between the connection bracket 12 and the gaming area 202). The placing area 201 is used for placing a keyboard. The joystick 31 and the control buttons 32 are located on the gaming area 202.

For ease of operation, the gaming area 202 where the joystick 31 and the control buttons 32 are located is close (proximate) to the user, and the display screen 40 is placed at the placement position of the connection bracket 12 away from the user to improve comfort. Positioning the placing area 201 for placing a keyboard between the gaming area 202 and the supporting surface 101 can make full use of the space of the gaming table 20, and the practicability of the arcade machine is effectively improved.

Figure 3:
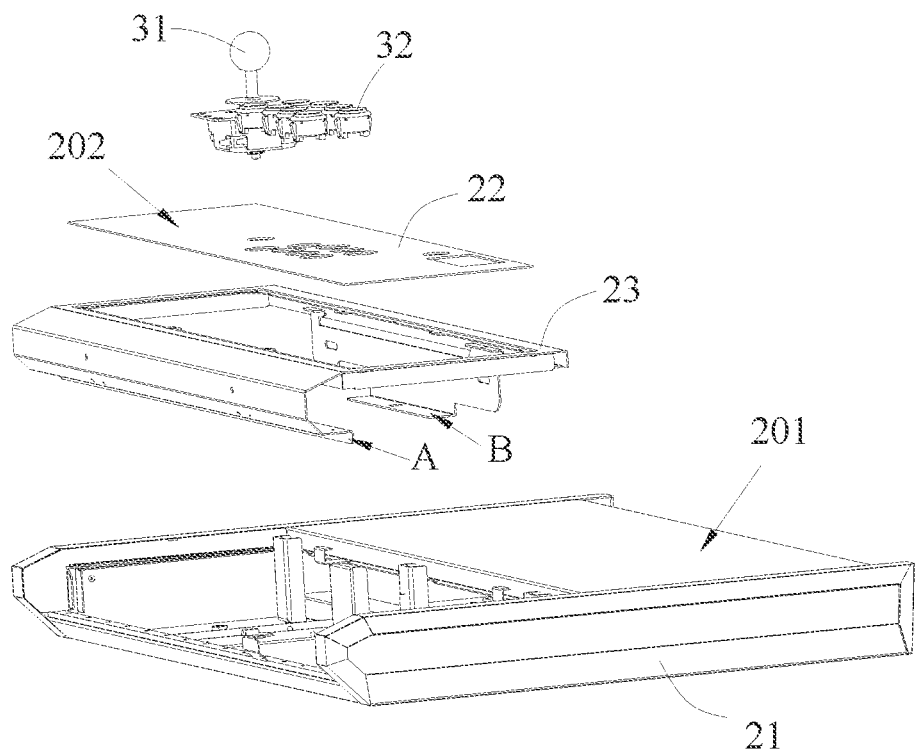
FIG. 3 is an exploded schematic view of a gaming table according to an embodiment of the present disclosure.

In another embodiment of the present disclosure, referring to FIG. 3, the gaming table 20 may include a box body 21 (e.g., a housing) and a control panel 22. A control circuit board is arranged in the box body 21. The joystick 31 and the control buttons 32 are arranged on the control panel 22, and the control panel 22 can be detachably connected to the box body 21. The control panel 22 can be detachably connected to the box body 21, so that the control panel 22 can be opened for maintenance or replacement of the control circuit board, the joystick 31, and/or the control buttons 32.

In some embodiments, the control panel 22 can be detachably connected to the box body 21 through a cover member 23. In some embodiments, the cover member 23 is provided with an accommodating hole for the control panel 22 to be inserted. The control panel 22 is placed in the accommodating hole and may be fixedly connected with the cover member 23 by welding or other in any other suitable manner. The cover member 23 can be detachably connected to the box body 21 by fasteners or in any other suitable manner. The fasteners can be screws. The cover member 23 is a custom-shaped structure, and the structure is designed according to the configuration of different box bodies 21. Since the control panel 22 needs to integrate the structures such as the joystick 31 and the control buttons 32, the control panel 22 may be separated from the cover member 23, so as to facilitate the integrated assembly of the structures such as the joystick 31 and the control buttons 32, and improve the overall production efficiency of the gaming table 20.

In some embodiments, referring to FIGS. 3 and 4, the cover member 23 is provided with an engagement end A and a fastening (e.g., screwing) end B arranged oppositely. The engagement end A of the cover member 23 is engaged with the box body 21, and the screwing end B is screwed to the box body 21 to realize the detachable and fixed connection between the cover member 23 and the box body 21. In other embodiments, the cover member 23 may include a hinging end and a screwing end oppositely arranged, and the cover member 23 may be rotatably connected with the box body 21 at the hinging end to open or close the box body 21. When the cover member 23 closes the box body 21, the cover member 23 is screwed with the box body 21 at the screwing end to prevent the cover member 23 from rotating (e.g., to maintain the cover member 23 in a closed configuration), so as to achieve the fastening of the cover member 23 and the box body 21. In other embodiments, the cover member 23 and the box body 21 may be detachably connected only by screwing or other fastening.

In some embodiments, the main bracket 11 may be formed by connecting a plurality of hollow rods with rectangular cross-sections, which reduces structural weight while ensuring structural strength. This improves the convenience of handling and reducing the transportation costs.

Referring to FIG. 5, the main bracket 11 includes a plurality of branch brackets that may be detachably connected. The branch brackets may include a left bracket 111, a right bracket 112, a back bracket 113 and a top bracket 114. The left bracket 111 and the right bracket 112 may be arranged symmetrically on the left and right sides, respectively, the back bracket 113 may be connected to the rear side of the left bracket 111, and the top bracket 114 may be connected to the upper side of the left bracket 111. The left bracket 111 and the right bracket 112 can be both welded and connected by a plurality of the above-mentioned rods to form an integral frame, and the back bracket 113 and the top bracket 114 can be formed by welding the above-mentioned rods to form an I-shaped frame. The left bracket 111, the right bracket 112, the back bracket 113, and the top bracket 114 can be detachably connected by fasteners. In some embodiments, the fasteners can be screws. This arrangement enables the main bracket 11 to be disassembled into a plurality of independent branch brackets to facilitate handling and to reduce transportation costs.

It should be noted that, the rods constituting the main bracket 11 can be rods of the same specification, that is, the cross-sectional shapes and sizes of the rods are the same. The rods constituting the main bracket 11 can be rods of the different specifications and different sizes, for example, the vertical rods that mainly bear the pressure may be larger-sized rods, and the top bracket 114 that mainly bears the uniform load may be smaller-sized rods. Those skilled in the art can set the material, quantity, size and position of the rod according to actual needs, which are not limited here.

In some embodiments, referring to FIG. 5, the main bracket 11 further includes a bottom support plate 115, and two sides of the bottom support plate 115 are respectively connected to the left bracket 111 and the right bracket 112. The arrangement of the bottom support plate 115, on the one hand, serves as a part of the main bracket 11 to improve the overall strength of the structure, and, on the other hand, can serve as a platform for placing items. The bottom support plate 115 can be detachably connected to the left bracket 111 and the right bracket 112 through fasteners. In some embodiments, the fasteners can be screws. Similarly, the main bracket 11 may also be additionally provided with a middle support plate 116 between the left bracket 111 and the right bracket 112 and above the bottom support plate 115. The middle support plate 116 may be detachably connected with the left bracket 111 and the right bracket 112 through fasteners. In some embodiments, the fasteners can be screws.

In some embodiments, referring to FIG. 5, the left bracket 111 and/or the right bracket 112 can be further provided with a storage basket 117, and the storage basket 117 is used, for example, for placing items such as water cups, earphones, and game handles. The storage basket 117 can be detachably connected to the left bracket 111 and/or the right bracket 112 through fasteners.

In some embodiments, referring to FIG. 5, the lower side of the main bracket 11 may include a plurality of support feet 118, and the height of the support feet 118 may be adjustable. In the illustrated structure, the left bracket 111 and the right bracket 112 may each be connected with two support feet 118, and the four support feet 118 jointly support the arcade machine. The height of the support feet 118 can be adjustable so that the operator can adjust the height of each support feet 118 according to various needs to adapt to different ground conditions and ensure that the gaming table 20 and the supporting surface 101 of the arcade machine are in a horizontal state. The support feet 118 can use existing support feet, which will not be described in detail. Those skilled in the art can also replace some or all of the support feet 118 with running wheels/universal wheels with a self-locking structure, which is not limited herein.

In some embodiments of the present disclosure, the control circuit board may include a built-in video switching software to match the working modes of different game machines or computers, and the control unit 30 may further include a switching control 33 corresponding to the video switching software. The video switching software is electrically connected to the switching control 33. When the switching control 33 is turned on, the control circuit board switches to the working mode corresponding to the computer/game machine connected from the interactive interface under the action of the video switching software, and converts the corresponding video output to the display screen 40.

With the arrangement of the video switching software and the switching control 33, the arcade machine can be applied to different home game machines, game boxes, game mobile phones, etc., thereby improving the functionality and practicability of the arcade machine.

In some embodiments of the present disclosure, referring to FIG. 1, the switching control 33 may be provided at (e.g., on or in) the connection bracket 12. It can be understood that the switching control 33 generally performs the switching operation before the game starts. Arranging the switching control 33 at the connection bracket 12 away from the gaming area 202 where the joystick 31 and the control buttons 32 are located can effectively prevent the user from accidentally touching the switching control 33 during the game and thus accidentally quitting the game. In some embodiments, the switching control 33 may be provided on the carrier plate of the connection bracket 12 to allow the user to operate the switching control 33 from above the arcade machine.

In the structure shown in FIG. 1, the switching control 33 may be located on the right side of the supporting surface 101, and in other embodiments, the switching control 33 may be located on the left side of the supporting surface 101. Those skilled in the art can also set the switching control 33 on the gaming table 20, for example, on the gaming area 202 or the placing area 201, which is not limited herein.

In another embodiment of the present disclosure, referring to FIG. 1, the control unit may further include functional buttons 34 electrically connected to the control circuit board, and the functional buttons 34 can be arranged on the gaming area 202. The joystick 31, the control buttons 32, and the functional buttons 34 can be arranged in a complete set (e.g., the joystick 31, the control buttons 32 and the functional buttons 34 together form a set of control structures).

FIG. 1 shows an arcade machine operated by a single person, corresponding to a set of control structures. The joystick 31 and the control buttons 32 may be located in the middle of the gaming area 202 and may be spaced from left to right (e.g., biased left or right) to conform to the user's operating habits and ergonomics. The functional buttons 34 may be located at the upper right position of the gaming area 202 (e.g., the upper right position of the joystick 31 and the control buttons 32). In other embodiments, the functional buttons 34 may be located at the upper left position of the gaming area 202, which is not limited herein.

Figure 6:
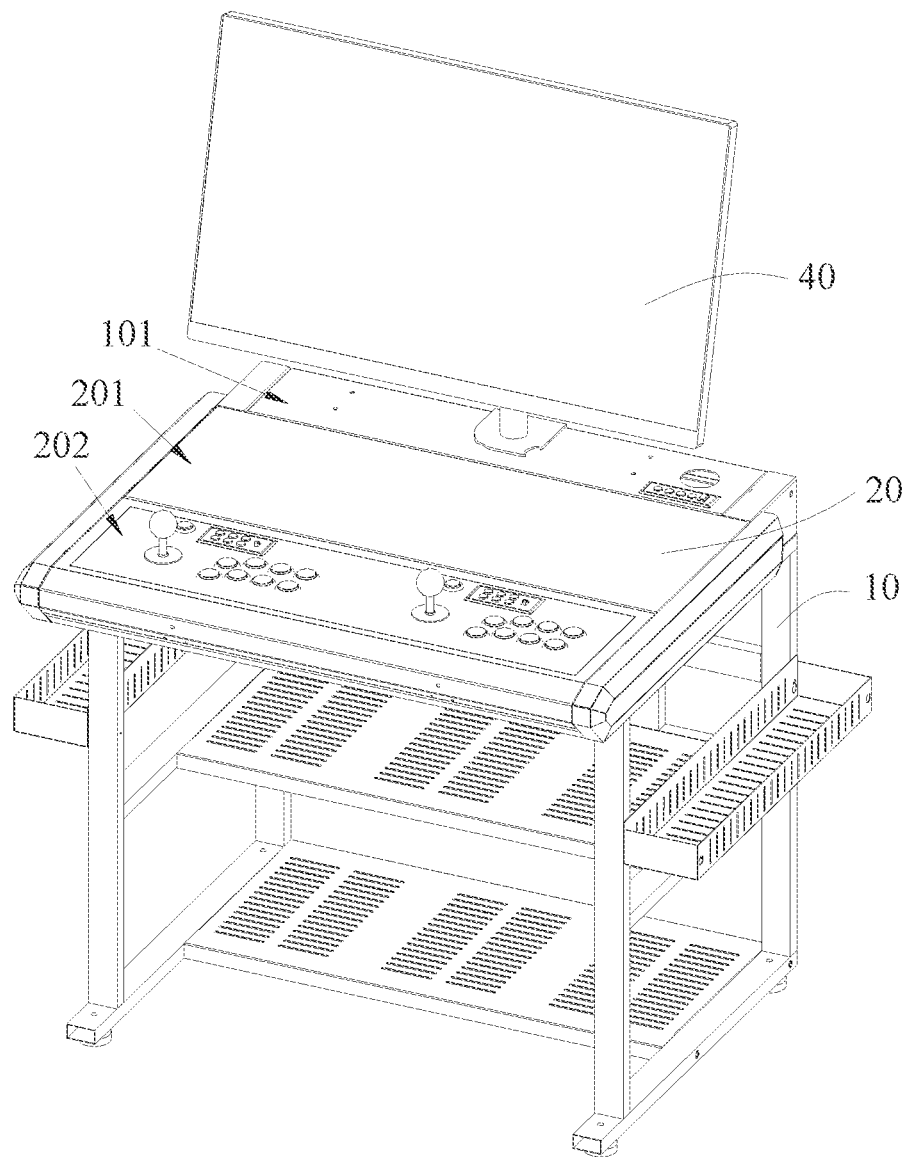
FIG. 6 is a second structural schematic view of an arcade machine according to an embodiment of the present disclosure.

FIG. 6 shows an arcade machine operated by two people, corresponding to two sets of control structures. Two sets of control structures may be arranged at intervals on the left and right. In any set of control structures, the joystick 31 and the control buttons 32 are arranged at intervals on the left and right, and the functional buttons 34 are located at the upper left of the control buttons 32, which is not limited herein.

The above descriptions are only preferred embodiments of the present disclosure and are not intended to limit the present disclosure. Any modifications, equivalent replacements and improvements made within the spirit and principles of the present disclosure shall be included within the protection of the present disclosure.

The invention claimed is:

1. An arcade machine, comprising:
a support bracket;
a gaming table detachably connected to the support bracket; and
a control unit coupled to the gaming table, the control unit comprising a control circuit board, a joystick, a plurality of control buttons, and a connection interface electrically connected to the control circuit board,
wherein the control circuit board, the joystick, and the control buttons are arranged on the gaming table, and
wherein the connection interface comprises a video interface configured for connecting a display screen and an interactive interface configured for connecting to a computer or a game machine,
wherein the support bracket comprises a main bracket, the main bracket comprising a plurality of branch brackets that are detachably connected to each other, each of the plurality of branch brackets comprising a plurality of hollow rods with rectangular cross-sections.

2. The arcade machine according to claim 1, wherein the support bracket comprises a connection bracket connected to the main bracket, wherein the gaming table is on the main bracket and engaged with the connection bracket, and wherein the connection bracket comprises a supporting surface configured for supporting a display.

3. The arcade machine according to claim 2, wherein the control circuit board comprises video switching software to match working modes of different game machines or computers, and wherein the control unit further comprises a switching control corresponding to the video switching software.

4. The arcade machine according to claim 3, wherein the switching control is on the connection bracket.

5. The arcade machine according to claim 2, wherein:
the connection bracket comprises a carrier and a plurality of support members, a first support member of the plurality of support members is connected to a first end of the carrier and a second support member of the plurality of support members is connected to a second end of the carrier,
a side surface of the carrier facing away from the main bracket is the supporting surface,
a side of each support member of the plurality of support members facing away from the carrier is connected to the main bracket, and
a side of each support member of the plurality of support members comprises an engagement portion configured for engaging with the gaming table.

6. The arcade machine according to claim 5, wherein the carrier comprises a carrier plate and a surrounding edge connected to a periphery of the carrier plate, the carrier plate and the surrounding edge define an accommodating cavity, wherein the accommodating cavity is provided with a filling plate, and wherein a surface of the filling plate facing away from the carrier plate is flush with a side of the surrounding edge facing away from the carrier.

7. The arcade machine according to claim 2, wherein the gaming table comprises a placing area and a gaming area, the gaming area being located on a side of the placing area away from the connection bracket, and the placing area being configured for placing a keyboard, and wherein the joystick and the control buttons are arranged in the gaming area.

8. The arcade machine according to claim 1, wherein the gaming table comprises a box body and a control panel detachably connected to the box body, wherein the control circuit board is arranged in the box body, and wherein the joystick and the plurality of control buttons are arranged on the control panel.

9. The arcade machine according to claim 8, wherein the control panel is detachably connected to the box body by a cover member, wherein the control panel is fixedly connected to the cover member, and wherein the cover member comprises an engagement end and a screwing end opposite to the engagement end, wherein the engagement end is engaged with the box body, and wherein the screwing end is screwed to the box body.

* * * * *